United States Patent
Gibson et al.

(10) Patent No.: US 7,167,793 B1
(45) Date of Patent: Jan. 23, 2007

(54) ENGINE POSITION CORRECTION

(75) Inventors: Alex O. Gibson, Ann Arbor, MI (US); John R. Grabowski, Dearborn, MI (US); Theodore J. Filippi, Trenton, NJ (US); William R. Goodwin, Farmington Hills, MI (US); Ilya V. Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/206,604

(22) Filed: Aug. 18, 2005

(51) Int. Cl.
*F02D 45/00* (2006.01)
*G12B 13/00* (2006.01)
(52) U.S. Cl. .................. 701/114; 701/115; 73/1.75
(58) Field of Classification Search ............. None
See application file for complete search history.

(56) References Cited

U.S. PATENT DOCUMENTS

| 5,237,862 A | 8/1993 | Mangrulkar et al. |
| 5,321,979 A | 6/1994 | Mc Kendry et al. |
| 5,429,093 A * | 7/1995 | Fukui et al. ............ 123/406.58 |
| 5,528,931 A | 6/1996 | James et al. |
| 5,611,311 A | 3/1997 | Tomisawa |
| 5,692,488 A | 12/1997 | Schrey et al. |
| 6,615,644 B2 * | 9/2003 | Koo et al. .................. 73/117.3 |

FOREIGN PATENT DOCUMENTS

JP 2001-289106 A * 10/2001

* cited by examiner

Primary Examiner—Andrew M. Dolinar
(74) Attorney, Agent, or Firm—Donald J. Lewis (57) ABSTRACT

A method for improving engine position sensing of an internal combustion engine is described. According to one aspect of the description, the determination of engine position may be improved by correcting rotational position of the internal combustion engine at a number of engine locations.

15 Claims, 4 Drawing Sheets

ENGINE POSITION CORRECTION

FIELD

The present description relates to a method for determining engine position for an internal combustion engine.

BACKGROUND

One method to correct sensed position of an internal combustion is described in U.S. Pat. No. 5,692,488. This method presents a way to correct engine sensor data from a bottom-dead-center (BDC) marker signal by using information gathered from a determined engine position. Then the BDC correction is used to adjust the location of other engine angle markers. Specifically, the BDC marker is corrected based on an assumption that the maximum cylinder air charge occurs when an intake valve closes at BDC and that the valve closing location that corresponds to BDC can be determined based on the maximum cylinder air charge. Consequently, the method attempts to find an intake valve closing time that results in the maximum cylinder air charge for a set of engine operating conditions. In one example, the method attempts to determine maximum cylinder charge for a selected intake valve closing time from fuel injection time and exhaust gas oxygen concentration. Alternatively, the method may use a constant injection time and vary intake valve closing timing to establish the valve timing that produces the leanest exhaust air-fuel mixture. The intake valve closing position associated with the maximum cylinder air charge is then used as the location of BDC.

The above-mentioned method can also have several disadvantages. In particular, the method merely corrects the BDC marker position and then applies this correction to other engine angle markers. In other words, the method appears to acknowledge that factors such as manufacturing variation can produce variation between an engine position and a specific BDC marker, but the method assumes that this same error applies to other engine angle markers. For example, it can be possible that engine angle markers are not accurately spaced nor perfectly symmetrical (i.e., the high and low portions of the other engine angle marker signals are not uniform over an entire engine revolution). These types of irregularities may produce inter-teeth engine position detection variation (i.e., measurement errors between engine angle markers). In addition, other factors can also affect engine position detection such as speed dependant sensor measurement error, variation of wheel diameter, and the distribution of ferrous metal in the wheel. Further, the method relies on the assumption that maximum cylinder air charge occurs when intake valves are closed at BDC. However, this assumption may be invalid if the cylinder residual gas fraction is changed or if the inertia of the cylinder air charge causes the maximum cylinder air charge valve timing to be at a location other than BDC.

Another method to correct sensed position of an internal combustion engine is described in U.S. Pat. No. 5,611,311. This method compares a phase difference between a determined top-dead-center engine position and a referenced engine position sensed by a crank angle sensing means, to a predetermined value, and attempts to correct the crank angle position sensed by the crank angle sensing means by using a deviation of the crank angle phase difference from the predetermined value. In other words, a reference position can be compared to a determined engine position so that an offset (measured in crank angle degrees) may be determined. This offset can then be combined with sensed crank angle position to estimate actual engine position.

This method can also have several disadvantages. For example, similar to the previously mentioned method, this method attempts to account for measurement offset from an engine position, namely top-dead-center. However, this method also fails to correct for variations between sensed engine angles. Further, the method may be costly and/or impractical to implement on an engine since the method relies on a cylinder pressure sensing device to determine the engine angle correction amount.

The inventors herein have recognized the above-mentioned disadvantages and have developed a method of correcting engine position that offers substantial improvements.

SUMMARY

One embodiment of the present description includes a method to compensate for variations in engine positioning sensing of an internal combustion engine, the method comprising: producing at least one indication of a reference position over a revolution of an internal combustion engine; producing a plurality of engine angle indications over a revolution of said internal combustion engine; and compensating more than one of said plurality of engine angle indications by adjusting more than one of said indications of engine angle position, relative to the respective distances that said indications of engine angle position are from said indication of said reference position. This method overcomes at least some of the limitations of the previously mentioned methods.

By correcting engine position relative to an engine position marker, determination of engine position may be improved since factors that can produce variation between engine angle markers, such as manufacturing variation, engine speed dependant variation, and material variation, may be compensated. For example, when linked to an engine, each engine angle marker that is produced by an engine position determining device may vary a unique amount from the respective absolute engine position it is designed to represent. The variation between engine angle markers and the absolute engine positions that they represent may not be eliminated by merely providing an offset to the angle marker that is derived from the distance between an engine position and an indication of an engine reference position (e.g., if there is a 2° offset between a determined engine position and an indication of an engine reference location, it may be likely that adding the offset amount to the absolute position of individual wheel teeth will increase the position error of some teeth while decreasing the position error of other teeth). However, the variation between engine angle markers and the absolute engine positions they represent may be reduced, or be made more consistent, by compensating respective engine angle markers relative to respective distances that the markers are from an engine reference position (i.e., compensating for inter-teeth position errors). In addition, since the method can compensate for variations between engine angle marks, it may not be necessary to use costly and/or delicate high resolution engine position sensing devices for reducing engine position variation. Further, the operation of engine position related controls (e.g., fuel injection, electrically actuated valves, and spark timing) may be improved since errors between markers that indicate engine angle position may be reduced.

Further still, the method may be less costly compared to previous engine angle correction methods since it may be implemented without using pressure sensors or oxygen sensors.

The present description may provide several advantages. In particular, the approach may provide corrected engine angle information that reduces the amount of error between engine angle markers so that control of devices that rely on engine position information may be improved. Further, the method may be implemented using common sensors so that cost and complexity of engine position correction may be reduced.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
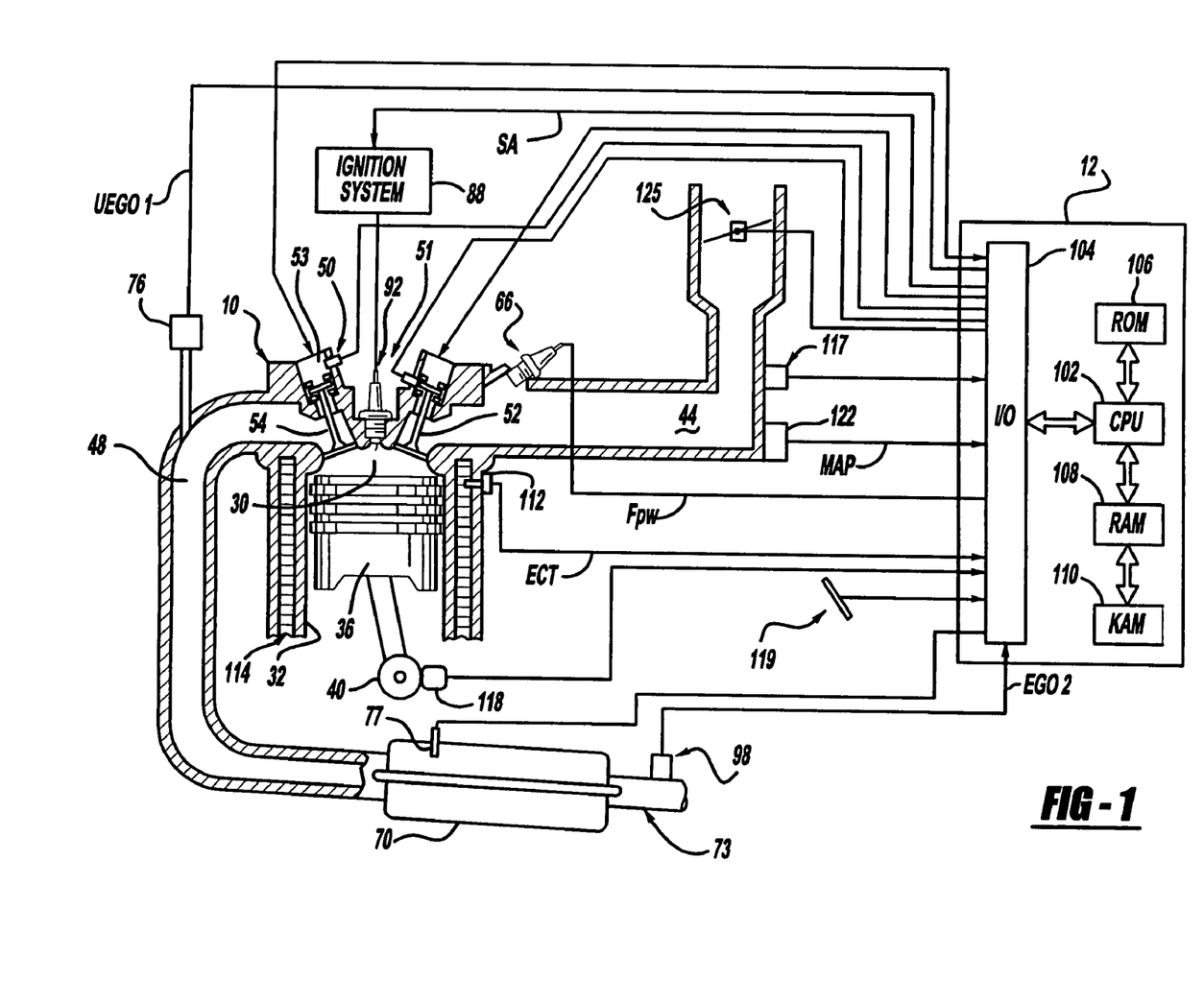
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, the intake 52 or exhaust 54 valve may be mechanically actuated via a camshaft, for example. Further, a mechanical device may be used to control valve lift and/or valve timing. Valve actuator armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 73 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from sensor 118 sensing crankshaft 40 position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Figure 2:
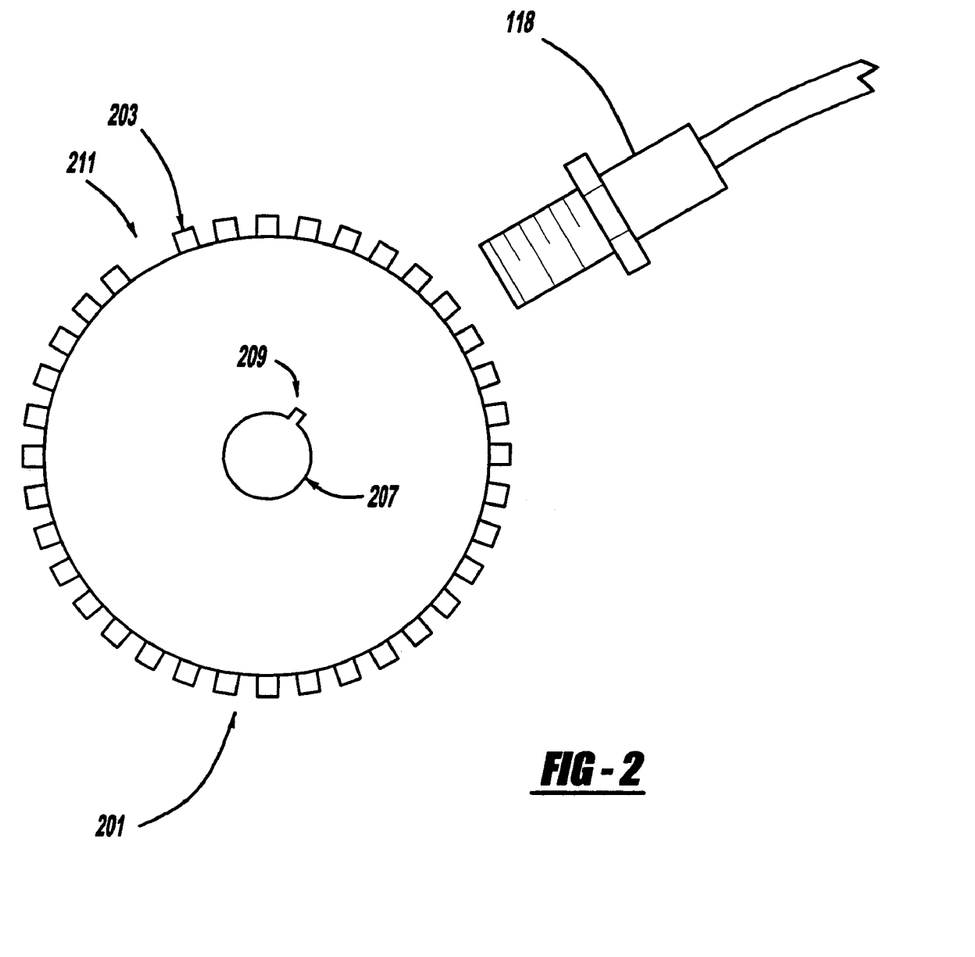
FIG. 2 is a schematic diagram of an example engine position sensing device.

Referring to FIG. 2, a schematic of an example engine position indicating device is shown. Crankshaft timing wheel 210 may be coupled to crankshaft 40 for determining engine position. The wheel may be coupled to the engine crankshaft via a mounting hole 207. Further, the wheel can be oriented with respect to an engine position by aligning key way 209 to a mutual crankshaft key way. Alternatively, another type of locating device or scheme may be used to align the marker wheel to the crankshaft, a spline and locating dimples, for example. The marker wheel is shown having teeth (an example of engine angle markers) spaced at 10 degree intervals. At one wheel location, a tooth is omitted to provide additional engine position information. That is, the absence of a tooth can correspond to a unique crankshaft position. Alternatively, engine angle markers may be spaced at other intervals to increase or decrease engine position detection resolution as desired. Individual wheel teeth 203 may be made of a ferrous metal alloy, for example, so that they may cause engine position sensor 118 to output an electric signal when a tooth passes by the sensor. The output of sensor 118 may be a function of a number of variables including: the distance between the face of sensor 118 and wheel teeth 203 (i.e., the gap), wheel material, sensor type, temperature, wheel speed, and tooth size.

An engine reference position marker may be produced by determining the location of the missing tooth and then by keeping track of the position in the memory of processor 12, for example. Alternatively, a reference signal may be produced from another sensor such as a camshaft position sensor, for example, or by combining the output of several sensors into an engine reference position indication that is stored in processor 12 memory or as an electrical signal. In an alternate embodiment, the tooth wheel may be replaced by another type of engine angle marker such as a wheel having light permeable slots for determining engine position by optical sensors, for example.

It is possible for engine reference position identifying devices to have different angular distances between engine position indicators. For example, a tooth wheel similar to the one illustrated in FIG. 2 may exhibit variation of tooth spacing, tooth height, and/or tooth width that may be due to manufacturing tolerances, for example. Further, variation may occur between the manufacture of different marker wheels. That is, wheel diameters and/or wheel material may vary from wheel to wheel. Consequently, the engine angle indications provided by a group of marker wheels may deviate between members of the group and between the respective positions that the wheels are designed to identify. Reducing engine angle identification variation can be desirable since the variation can contribute to undesirable engine performance and emissions. For example, electrically actuated intake and/or exhaust valves may be operated, at least some times, in synchronism with crankshaft position. However, merely operating valves synchronously with piston strokes may not be adequate to achieve a desired level of control. Rather, controlling valve opening and closing locations to selected crankshaft positions offers an opportunity to achieve improve control of EGR, inducted air quantity, fuel puddle mass, charge mixing, and charge motion. By correcting inter-teeth variation, as well as the engine reference position, it may be possible to improve control of engine performance and emissions.

Note: The engine position sensing system illustrated in FIG. 2 is not intended to limit the scope or breadth of the description and as such is meant purely for purposes of illustration by example.

Figure 3A:
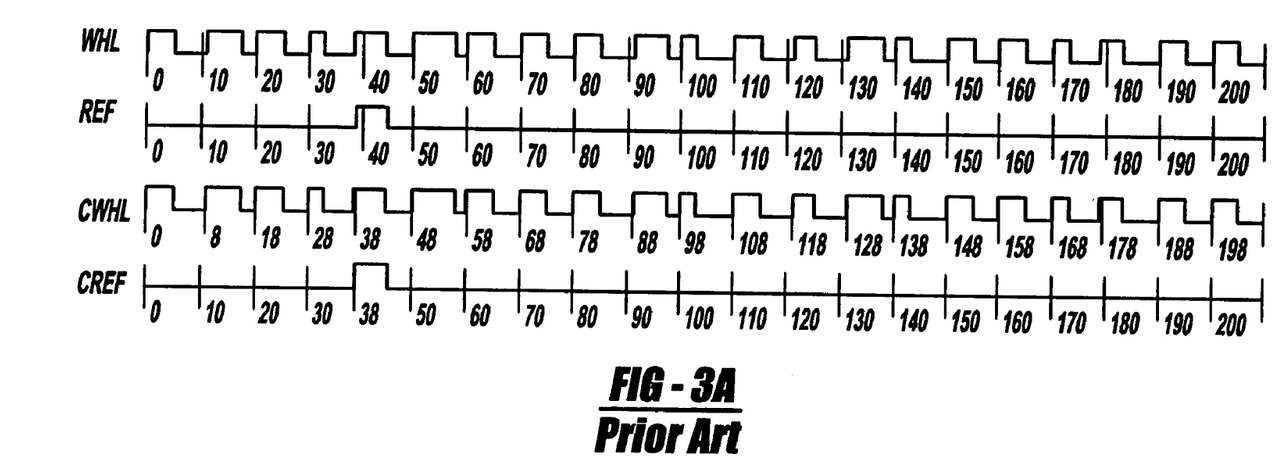
FIG. 3a is a plot of a method shown in prior art to correct engine position sensing.

Referring to FIG. 3A, a plot is shown to illustrate a known method that may reduce variation of engine position. Four timing sequences are shown to illustrate the method. The sequence names are located on the left hand side of the figure and each sequence is referenced to a crankshaft angle (0° corresponds to TDC of cylinder 1 compression stroke and the engine angle references correspond to the vertical timing mark to the left of each angle reference). The WHL sequence illustrates a simulated series of engine angle markers that could be produced by a tooth wheel and sensor engine angle identification system as an engine is rotated. The high portion of the signal represents a wheel tooth while the low portion represents gaps between wheel teeth. It can be recognized that tooth size and the spacing between teeth (inter-tooth variation) can vary. These variations may be due to manufacturing tolerances or sensor placement (i.e., the distance between the sensor face and the teeth), for example. In addition, some of the leading edges of the teeth are offset from the engine crankshaft angle that they are supposed to represent. For example, the leading edge of the WHL signal near the 10° marker is closer to 12°. In other words, when a leading edge is detected it can be interpreted as a predetermined engine position, 10° for example, but it may actually occur at 12°, thereby introducing 2° of error in the engine position measurement at the 10° engine position marker. The REF signal represents a simulated engine reference signal that may be designed to identify a specific engine position, 40° after top dead center (ATDC) of cylinder one compression stroke in this example. Alternatively, the reference signal may be located at another engine position to improve detecting any difference between a reference marker indication and an actual engine position (e.g., TDC and/or BDC of selected cylinders). Further, there may be more than one reference marker per engine revolution. In this example, the illustrated reference signal corresponding to 40° ATDC is actually located at approximately 38° ATDC. The CWHL series represents the prior art method of correcting the sequence of simulated engine angle markers illustrated by the WHL sequence. The teeth durations are identical to the series illustrated by the WHL signal, but the angles that the leading edges represent are shifted by approximately 2° (the amount of difference between the reference position signal and the engine position it represents in this example) and any amount of error between the leading edge of the tooth and the actual engine position. The prior art method shifts the REF signal relative to a determined engine position using information from a cylinder pressure transducer or from valve timing and an oxygen sensor, for example. The CREF signal represents the corrected reference angle. Thus, the reference signal is adjusted to a determined engine position to produce CREF and then the CWHL signal is adjusted relative to the CREF correction. In other words, the prior art method attempts to correct an offset that may be present between the engine and the engine angle indicating device but does not correct for any inter-teeth variation or sensor related variation.

Note: the CWHL and CREF signals do not have to be synthesized electrical signals as represented by FIG. 3A, they may be time or event stamped markers that may reside in processor 12 memory locations or alternatively they may be produced other ways.

Figure 3B:
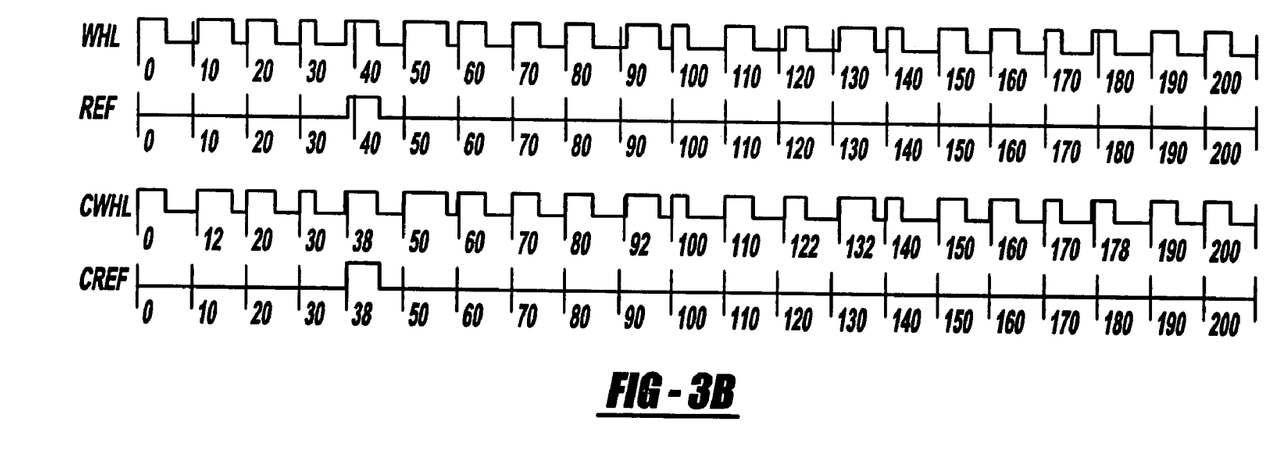
FIG. 3b and of an example method disclosed in the present description to reduce variation of engine position sensing.

Referring to FIG. 3B, a plot is shown to illustrate an example of the present description. Four sequences that are similar to the sequences illustrated in FIG. 3A are shown. The WHL and REF signals are identical to those shown in FIG. 3A, while the CWHL and CREF signals are used to illustrate an example of the method of the present description. The leading edges of the corrected wheel position signal, illustrated by CWHL, are aligned to the actual corresponding engine positions. That is, the position of the leading edge of the teeth can be corrected for an offset from a determined engine position as well as inter-tooth variation. In addition, the method may also be used to correct the location of falling tooth edges or to correct rising and falling edges. That is, both leading and falling teeth edges may be compensated so that even finer engine angles may be resolved. In addition, the CREF signal can be aligned to a determined engine position so that an offset between the engine position indicator and the engine may be reduced.

Figure 4:
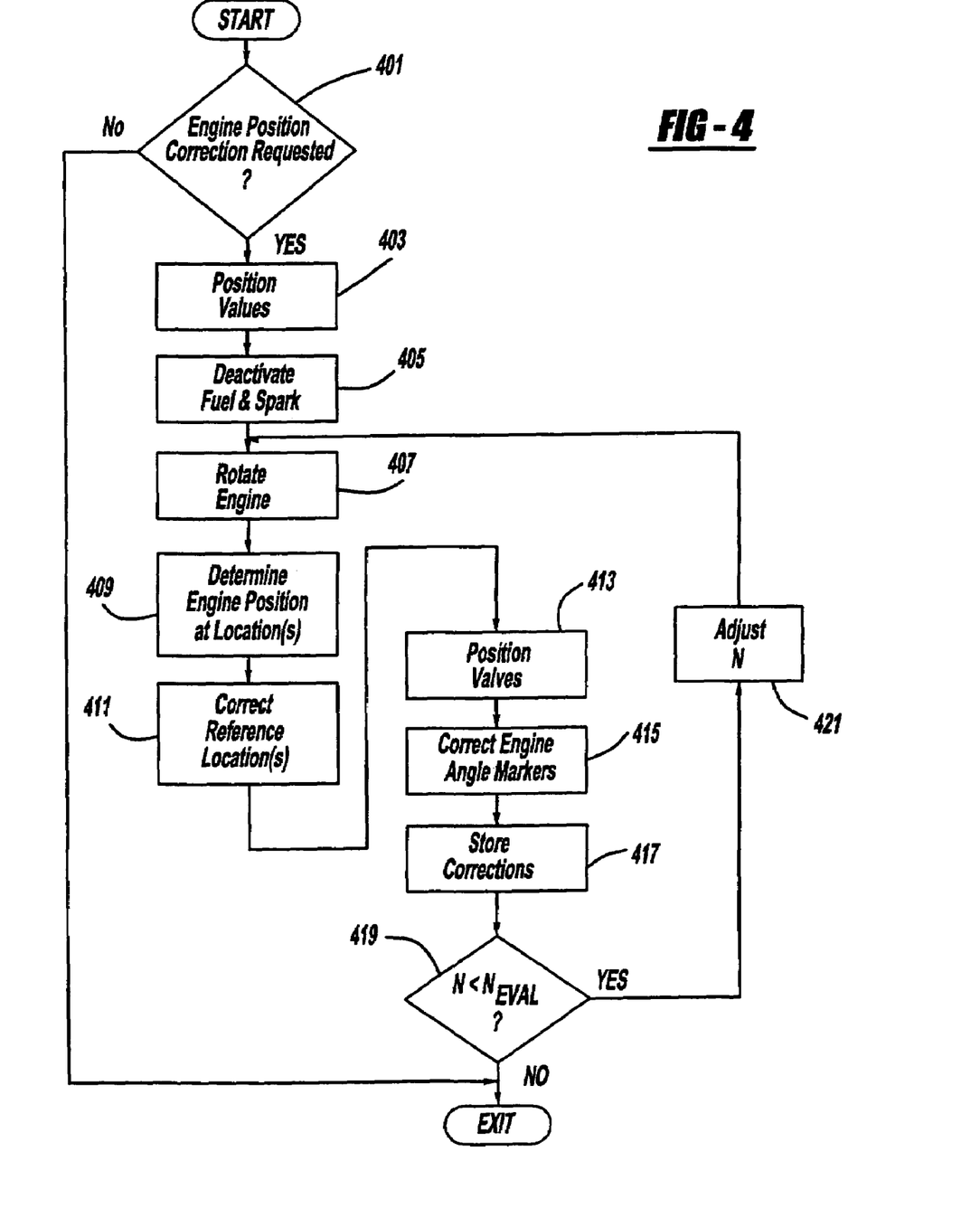
FIG. 4 is a flow chart of an example strategy to correct engine position.

Referring to FIG. 4, a flow chart of an example strategy to determine engine position correction is shown. In step 401, the routine determines if conditions are desirable for determining correction factors for engine angle and reference markers. The sequence may be initiated by a user request or by a system generated request. A user generated correction request may be initiated when the engine can be rotated by the power of a motor (e.g., a dynamometer, starter motor, a hybrid vehicle motor, a hydraulic motor, or an integrated starter/alternator), for example. A system generated request may be generated by satisfying control logic residing in processor 12 such as logic identifying deceleration fuel shut off conditions or engine starting, for example. If conditions are desirable to determine engine position corrections the routine proceeds to step 403, otherwise the routine proceeds to exit.

At step 403, the engine throttle and/or valves may be set to a desired positioned or commanded to a predetermined timing. Some anticipated engine configurations may include adjustable valve timing and/or electrically actuated throttles to regulate engine air induction. By commanding these devices to selected positions, engine position identification may be improved. For example, depending on the method used to determine engine position, it may beneficial to set valve timings to predetermined sequences or positions (e.g., held open, held closed, held partially open, or by adjusting valve timing so that intake valve opening occurs substantially near TDC (e.g., ±15 crankshaft angle degrees) and so that intake valve closing occurs substantially near BDC (e.g., ±15 crankshaft angle degrees) while exhaust valve timing occurs substantially near TDC (e.g., ±15 crankshaft angle degrees), for example). By adjusting valve timing and/or throttle position engine speed variation may be increased or decreased to improve engine position detection accuracy. As the engine rotates, inducted air may be compressed and/or expanded, thereby altering the engine torque and the resulting engine speed variation over a cylinder cycle (i.e., a group unique cylinder strokes when combined form a cycle, intake-compression-power-exhaust for example). In one example, while an engine is being motored (rotated but not combusting an air-fuel mixture), throttle position and valve timing may be used to reduce the amount of engine speed ripple (i.e., the speed variation about an average engine speed) by reducing the cylinder compression and/or expansion work. By holding intake and/or exhaust valves in an open position as the engine rotates engine speed ripple may be reduced, at least during some conditions.

On the other hand, increasing the variation of engine speed about the average engine speed may improve the detection of certain engine positions, TDC and/or BDC for example. Specifically, TDC and/or BDC locations may be determined by locating instances of substantially zero instantaneous engine acceleration. As a result, it may be beneficial to increase the rate of engine speed variation so that engine positions where engine acceleration is near zero are more distinct from other engine positions having lower instantaneous acceleration. In addition, increasing the variation of engine speed about an average engine speed can also improve the possibility of locating engine positions where engine acceleration may be high, but these locations may be of less interest since they may change at different operating conditions.

The routine sets desired valve timing and/or position and proceeds to step 405.

At step 405, cylinder spark and/or fuel may be deactivated. As mentioned above, an engine reference position may be determined using engine speed, cylinder pressure, or cylinder air-fuel ratio. Cylinder fuel and spark may be deactivated depending on the selected engine position determination method. If deactivation of spark and/or fuel can improve engine position determination, then spark and/or fuel may be deactivated. In general, spark and fuel are deactivated when it is desirable to reduce engine speed variation. The routine continues to step 407.

In step 407, the engine can be rotated at a predetermined selected speed. If it is desirable to rotate the engine without combustion, the engine may be rotated by a motor or by coupling the engine to the driveline of a decelerating vehicle, for example. In one example, the engine may be rotated after assembly using a dynamometer, an integrated starter-alternator, or a hydraulic motor. The initial rotation speed is usually selected to be a low (e.g., 600 RPM for a V8, 700 RPM for a V6, and 800 RPM for a I4) and not coincident with an engine resonance speed.

If it is desirable to rotate the engine using combustion, then valve timing, spark advance, and fuel quantity may be held substantially constant so that engine speed variation may be controlled while engine position correction terms are being determined. The routine proceeds to step 409.

In step 409, engine position is determined at one or more locations. As mentioned above, it may be possible for measurement offset errors to occur between the output of an engine position indicating device and an engine position. Engine position may be determined in a number of ways including the methods described in U.S. Pat. Nos. 5,692,488 and 5,611,311 which are hereby fully incorporated by reference. However, these methods may require additional sensors and/or system complexity to implement. Nonetheless, the inventors herein have determined that it may be possible to locate TDC and/or BDC by differentiating engine speed and then locating positions on substantially zero acceleration. The occurrences of zero acceleration may be used to establish engine positions for correcting the output of an engine position indicating device. As mentioned above, it may be desirable to increase the variation of engine speed about an average engine speed so that detection of certain engine positions, namely TDC and BDC, may be improved. The routine proceeds to step 411.

In step 411, the reference position of an engine position indicating device can be corrected. By correcting an indicated reference position on the basis of a determined engine position it may be possible to reduce errors that may be caused by an engine position indicating device.

In one example, an engine can be operated at a substantially constant speed and the engine speed can be multiplied by the time it takes the engine to rotate from a determined engine position until a reference signal may be observed. This can be described by the following equation:

$$\text{ref\_cor(deg)} = n\left(\frac{\text{deg}}{\text{sec}}\right) \cdot \text{dist\_time(sec)}$$

where ref_cor is the reference correction or the distance in degrees between a determined engine position and a reference indication that may be produced by an engine position indicating device, for example, n represents engine speed in units of degrees per second, dist_time is the time in seconds that it takes the engine to rotate from the determined engine location until an reference indication is observed. The correction of the determined engine location with respect to the reference marker can then be expressed by the following equation:

$$Cor\_ref = iref - eref$$

Where Cor_ref is the position correction between the determined engine position and the indicated engine reference position, iref is the indicated engine reference position, and eref is the expected engine reference position. As an example, it may be desirable for a crankshaft mounted wheel to output a reference signal at 40° ATDC. However, the above-mentioned method may determine that the indicated reference signal is actually located at 38° ATDC. Therefore, the position correction is −2° since the indicated engine position reference is located 2° degrees before the expected engine reference position. The expected reference location provided by the engine position indicating device can be corrected so that the reference signal represents an engine position of 38° ATDC instead of 40° ATDC.

In an alternate example, the distance between the determined engine position and the reference position may be determined by counting the number of engine angle markers between the determined engine position and the reference position. For example, where a reference indication is designed to locate an engine position of 40° ATDC, thirty eight engine angle markers spaced at 1° may be counted between a determined TDC location and the engine reference marker. Similarly, 2° of correction may be provided to the expected reference location so that alternate method also properly locates the reference marker at 38°.

The determined engine position mentioned above may be established in several ways. In one example, engine speed is determined by calculating the time it takes for the engine to rotate between two indicated crankshaft positions that are separated by a known angular distance (e.g., if it takes 0.000667 seconds to travel an angular distance of 10° the engine speed is 2500 RPM). The derivative of engine speed is taken so that engine acceleration may be used to determined engine locations having zero acceleration. The engine positions having zero acceleration can be identified as TDC or BDC locations for selected cylinders. Further, identification of TDC and/or BDC locations may be improved by averaging or filtering the acceleration signal over a number of engine cycles.

In an alternative embodiment, the determined engine position may be found using cylinder pressure, laser, or sound measurements. Specifically, the engine may be rotated while not combusting an air-fuel mixture by using an electric or hydraulic motor to improve engine position detection. Alternatively, the engine may be operated during certain conditions without spark and/or fuel, during deceleration fuel shut-off for example. As the engine rotates, each piston moves toward and away from a cylinder head. At TDC compression a trapped cylinder volume reaches a level that may be lower than during the remainder of the cylinder cycle. Since decreasing cylinder volume can increase cylinder pressure, pressure transducers can be used to locate a position of higher cylinder pressure relative to crankshaft position. Sonic or laser position detecting devices can detect piston position by sensing the piston distance relative to a spark plug hole, for example.

As mentioned above, there may be one or more reference indications over an engine revolution and a reference indication may be produced in several ways. For example, a reference indication may be produced by an artifact designed into a crankshaft position indicating device, a variable that may be modified by logical manipulations of engine conditions and that may be held in the memory of a processor, or by an engine position that is sensed during a calibration procedure (e.g., using optics, pressure, or sound to locate a piston moving in a cylinder). In addition, if the engine position detecting device does not produce a reference signal then the engine angle markers may be corrected back to a determined engine position, TDC and/or BDC reference for example, so that the determined engine position becomes the reference position. The routine proceeds to step 413.

In step 413, the engine throttle and/or valves may be positioned or commanded to a predetermined positions and/or timing. Throttle position, valve position, and/or valve timing may be based on the type of engine position correction request (e.g., user or system request) and engine operating conditions so that the valves and/or throttle may be controlled to improve the accuracy of correcting engine angle markers.

As mentioned above, intake valve and/or exhaust valves may be held open while the engine is rotated by an electric or hydraulic motor at a substantially constant speed. The open valves can reduce engine pumping work and speed variation during engine rotation, thereby reducing the variability of engine speed dependant measurements. The routine continues to step 415.

In step 415, the position of engine angle markers may be corrected. While the engine rotates, the time it takes to travel between an engine reference indication and selected engine angle marker can be used to determine the angular distance between the reference marker and the engine angle marker. By multiplying engine speed (degrees/sec) and time (sec) to travel between two engine positions, the distance (degrees) between the reference and an engine marker can be determined. For example, it may be desirable to have 10° of separation between the leading edge of an engine reference location and the leading edge of a selected engine angle marker. However, it may be determined for a particular engine rotating at 2500 RPM that the time it takes to move between the engine reference marker and an engine angle marker (thought to be located 10 degrees away) is 0.0008 seconds. This time amount corresponds to 12° at 2500 RPM. Accordingly, an adjustment or correction of 2° can be added to the base 10° value that is stored in memory for this indication when this engine angle marker is observed. Further, the inter-tooth correction can be combined with the reference indication correction to align the engine angle markers directly to the crankshaft position. For example, in the above mentioned reference marker correction the reference indicator was corrected from 40° to 38°. The above mentioned engine angle marker location would be corrected to 50° ATDC (38°+12°). In this way, corrections for each engine angle marker may be determined so that inter-tooth measurement variation may be reduced. Furthermore, this method may be extended to compensate for variations in the falling edges of engine angle markers so that even finer resolutions of crankshaft position may be corrected. The routine proceeds to step 417.

In step 417, corrections for engine references and engine angle markers can be stored in memory. The method described herein can make engine position corrections based on dynamically acquired data. As a result, the data may contain artifacts of dimensional variation, sensor based speed dependant variation, and material property variation, for example. As such, corrections can be stored in a table format for a variety of engine speeds. For example, for a engine position indicating device having one reference marker and thirty-six engine angle markers, thirty-seven correction terms may be stored at each engine speed where engine position is being compensated. Further, data in adjacent table locations may be interpolated to estimate engine position corrections where no data is recorded. The routine proceeds to step 419.

In step 419, the routine determines if engine position has been corrected for a desirable engine speed range. If the current engine speed is less than a desired evaluation engine speed ($N_{Eval}$) then the routine proceeds to step 419, otherwise the routine proceeds to exit. Alternatively, for engine position correction modes where the engine speed is decreasing during engine position correction (e.g., during deceleration fuel shut-off), if engine speed is below $N_{Eval}$ then the routine exits otherwise the routine proceeds to step 421.

In step 421, engine speed may be increased or decreased based on the engine position correction request. In one example, where engine speed may be controlled by an electric motor, engine speed may be increased in predetermined increments, 1000 RPM for example, until a target engine speed is achieved. By increasing engine speed, engine position corrections may be achieved over the engine operating range so that speed dependant variations may be reduced.

In another example, engine speed may be decreased during the engine position correction process. For example, if engine position corrections are made during deceleration fuel shut-off, engine speed can be allowed to be linked to the decelerating vehicle speed. That is, the engine speed may be coupled or partially coupled to the vehicle speed via the transmission so that engine position compensation may be achieved over a range of engine speeds. The routine proceeds to step 407.

Thus, engine position corrections determined by the method of FIG. 4 can be used to compensate engine position information that may be supplied by an engine position indicating device. When an engine start is requested, the current engine position may be retrieved from memory, decoded from information supplied by an engine position indicating device before engine rotation, or decoded from an engine position indicating device while the engine is rotating. This allows the engine processor 12 to align the correction terms with individual engine angle markers or reference markers. As the engine rotates, an index referencing the table location that holds an engine position correction term can be incremented so that the engine position correction coincides with the encountered engine position indication. Consequently, each engine position indication that may be produced by an engine position indicating device can be corrected relative to a determined engine position.

As will be appreciated by one of ordinary skill in the art, the routines described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to compensate for variations in engine positioning sensing of an internal combustion engine, the method comprising:

motoring an internal combustion engine;

during said motoring the engine speed is increased by step changes or by a predetermined ramp rate;

producing at least one indication of a reference angle over a revolution of an internal combustion engine during said motoring;

producing a plurality of engine angle indications over a revolution of said internal combustion engine during said motoring; and compensating more than one of said plurality of engine angle indications by adjusting more than one of said indications of engine angle position, relative to the respective distances that said indications of engine angle position are from said indication of said reference angle during said motoring.

2. A method to compensate for variations in engine positioning sensing of an internal combustion engine, the method comprising:

motoring an internal combustion engine;

holding open one or more valves of said engine during said motoring;

producing at least one indication of a reference angle over a revolution of an internal combustion engine during said motoring;

producing a plurality of engine angle indications over a revolution of said internal combustion engine during said motoring; and compensating more than one of said plurality of engine angle indications by adjusting more than one of said indications of engine angle position, relative to the respective distances that said indications of engine angle position are from said indication of said reference angle during said motoring.

3. The method of claim 2 further comprising holding open one or more valves of said engine during said motoring.

4. A method to compensate for variations in engine positioning sensing of an internal combustion engine, the method comprising:

producing at least one indication of a reference angle over a revolution of an internal combustion engine;

producing a plurality of engine angle indications over a revolution of said internal combustion engine; and correcting timing of a valve of said internal combustion engine, said correction in response to adjusting more than one of said indications of engine angle position relative to the respective distances that said indications of engine angle position are from said indication of said reference angle.

5. The method of claim 4 wherein said valve is an exhaust valve.

6. The method of claim 4 wherein said valve is an intake valve.

7. The method of claim 4 wherein said correcting timing of said valve adjusts the opening and closing time of said valve.

8. The method of claim 4 further comprising adjusting said reference position relative to a determined engine position.

9. The method of claim 8 wherein said engine position is top-dead-center or bottom-dead-center of a cylinder.

10. The method of claim 4 wherein said engine angle indication is produced from a gear wheel.

11. The method of claim 4 wherein said correcting timing of said valve comprises changing the opening position of a valve.

12. The method of claim 4 wherein said correcting timing of said valve comprises changing the closing position of a valve.

13. The method of claim 4 wherein said engine angle indication correction is made when said at least one electrically actuated valve is held in an open position.

14. The method of claim 4 wherein said engine angle indication correction is made when said at least one electrically actuated valve is held in a closed position.

15. The method of claim 4 further comprising motoring said engine while correcting said engine angle indications.

* * * * *